United States Patent [19]

van den Berg et al.

[11] 4,048,429

[45] Sept. 13, 1977

[54] PROCESS FOR THE PREPARATION OF POLYMER FIBERS

[75] Inventors: Cornelis E.P.V. van den Berg, Geleen; Hubertus J. Vroomans, Beek(L), both of Netherlands

[73] Assignee: Stamicarbon B.V., Geleen, Netherlands

[21] Appl. No.: 352,330

[22] Filed: Apr. 18, 1973

[30] Foreign Application Priority Data

Apr. 22, 1972 Netherlands .......................... 7205482

[51] Int. Cl.$^2$ ............................. C08F 6/12; C08F 6/06
[52] U.S. Cl. ........................................ 528/497; 264/8; 264/14; 264/69; 528/498; 528/502
[58] Field of Search ............. 260/94.9 F, 95 R, 95 C; 264/8, 14, 69; 528/497, 498, 502

[56] References Cited

U.S. PATENT DOCUMENTS 3,743,272  7/1973  Nowotny et al. ............... 260/94.9 F
3,995,001  11/1976  Vroomans et al. ................... 528/502
3,997,648  12/1976  Davis et al. ........................... 528/502

FOREIGN PATENT DOCUMENTS 1,137,457  5/1957  France ............................. 260/94.9 F
1,142,253  2/1969  United Kingdom ............ 260/94.9 F Primary Examiner—Alan Holler
Attorney, Agent, or Firm—Cushman, Darby & Cushman

[57] ABSTRACT

Polymeric fibers are produced from a polymer-solvent solution without mechanical agitation means by supplying a polymer solution in a solvent to a radial-symmetrical mixing chamber and causing a rotary flow therein which subjects the polymer to shearing forces while, at the same time, adjusting the temperature of the polymer-solvent mix to just below the precipitation temperature of the polymer. Under these conditions a polymeric fiber precipitates which, after separation from the solvent, is useful in the preparation of paper and textile products.

8 Claims, 4 Drawing Figures

PROCESS FOR THE PREPARATION OF POLYMER FIBERS

BACKGROUND OF THE INVENTION

The present invention relates to a process for the preparation of polymer fibers in which a polymer solution is cooled and subjected to shearing forces during the course of polymer precipitation.

The polymeric fibers thus obtained can be employed as a feedstock for the preparation of other useful products such as paper-like products, synthetic leather, textile products such as fibrous nonwovens, and also as a filler material in fiber-reinforced plastics.

It is well-known according to prior procedures that polyolefin fibers can be prepared during the polymerization stage by subjecting the reaction mass to a sufficiently strong shear stress; such a procedure is described, inter alia, in Belgian Pat. No. 533,382, examples 8 and 9; U.S. Pat. No. 3,231,515, example 3; and French Pat. No. 1,137,457. With this process a fibrous gel is produced in the reactor as described in Kunststoff-Rundschau, January 1968, page 38. Since the polymerization and the fiber formation take place in the same reaction vessel, the process conditions cannot be conveniently adjusted so that an optimum course of the two processes is ensured. The known method, moreover, has the drawback that a voluminous viscous mass is produced in the reactor, which has an unfavorable effect on the reactor capacity and causes difficulties when the polymerizate is being discharged from the reactor. Further, if stirrers are used, the fibers formed in the reactor will wrap around them, so that the polymerization has to be interrupted frequently for removing these entangled fibers.

In British Pat. Specification No. 1,142,253, the suggestion has been made to allow the fiber formation to take place outside the reactor and, according to this operation, a polymer solution is cooled and vigorously stirred, with the consequence that the shearing forces cause the polymer to precipitate from the solution in fibrous form. This process also has the same drawback that the fiber preparation has to be frequently interrupted for removing the fiber deposits from the stirrer.

The present invention provides a process permitting continuous preparation of the polymer fibers without involving the drawbacks mentioned above.

DETAILED DESCRIPTION OF THE INVENTION

According to the present invention there is provided a radial-symmetrical mixing chamber in which the polymer, mixed with a suitable solvent, is introduced into the mixing chamber and directing the flow in a rotary manner. Prior to introduction into the mixing chamber the polymer solution is mixed with a solvent that is identical with the solvent used for dissolving the polymer at a temperature such that the polymer precipitates in the mixture. The polymer may be supplied directly to the chamber in solution and additional solvent supplied or the polymer solution including the appropriate amount of solvent may be supplied in one stream. In operation, then, the solvent and/or the polymer solution are supplied to a radial-symmetrical chamber or housing such that a rotary flow is generated in the chamber. Thereafter, the fiber-solvent mixture is discharged, the solvent and fiber are separated from each other, isolating the precipitated polymer fibers from the solvent, and recycling at least part of the solvent thus recovered to the radial-symmetrical space via a heat exchanger.

In a rotary flow of this type there exists a radial velocity gradient that gives rise to velocity differences in the boundary plane between two concentric liquid layers and hence to shearing forces. In this regard, see U.S. Pat. No. 2,634,741. Under the influence of these shearing forces the polymer precipitating in the cooled solvent assumes a fibrous structure.

The amount and the temperature of the solvent fed to the radial-symmetrical space are preferably so selected that the mixture obtained by mixing with the polymer solution has a temperature slightly lower than the precipitation temperature of the polymer. The tendency toward formation of pulverulent polymer upon rapid cooling of the polymer solution is thus counteracted. Preferably the final temperature is about 5 to about 15° C below the precipitation temperature of the polymer. The precipitation temperature of a polymer depends upon a number of established factors, such as the structure, the molecular weight, the concentration of the polymer, and on the nature of the flow of the liquid in which the polymer is contained. For example, in a stirred solution polyethylene precipitates at about 107° C, polypropylene at about 115° C and polybutylene-1 at about 52° C. In a stagnant or standing solution the precipitation takes place at a lower temperature, e.g., at 96° C in the case of polyethylene. The appropriate temperature can be readily determined by the skilled worker based on the above principles.

As used herein the term precipitation temperature means the temperature at which the polymer precipitates under the flow conditions prevailing in the radial-symmetrical space.

Further cooling of the medium rotating in the radial-symmetrical space, if desired, can be achieved by external cooling of the space. The present invention is characterized by the absence of stirring members which, in prior procedures, caused fiber entanglement. Without stirring members the process is free from troublesome polymer-fiber deposits.

The polymer solution can be added to the solvent before the latter is fed into the radial-symmetrical space. However, the polymer solution can also be supplied to the vortex of the rotary flow. Discharging the mixture of solvent and precipitated polymer from the rotation chamber is preferably done along the chamber axis. As disclosed in U.S. Pat. No. 2,634,741, this makes it also possible, in the event the capacity is relatively small, to use a relatively large discharge aperture, and thus for a practical matter to exclude the hazard of the discharge aperture getting blocked up and clogged with the fibers that are formed.

The preferred rotation-symmetrical chamber used in the process of the present invention contains at least one tangentially directed feed pipe positioned perpendicular to the axis of the chamber. Typically the chamber is in the shape of a cone or a cylinder, preferably with one portion, the portion to which the feed pipe is supplied, having cylindrical walls, and the lower portion a conical or frustroconical shaped communicated to a discharge port which is positioned centrally and axially of the cylindrical chamber.

In one embodiment, as shown in FIG. 4, the rotation chamber is a cylinder confined between two planes perpendicular to the axis and provided with tangential feed pipe, one end of the cylinder terminating in a wall, optionally provided with a second inlet concentric with the axis of rotary flow in the chamber, while the other end is communicated to a conical portion, the apex of which communicates to a central outlet. Suitable rotation chambers are described in U.S. Pat. Nos. 2,634,741 and 3,234,995, the disclosures of which are incorporated herein by reference. The optimum dimensions of the chamber can easily be determined by one skilled in the art and will depend upon a number of factors including the viscosity of the solution contained within the chamber.

Upon leaving the radial-symmetrical space, the fibers formed are physically separated from the solvent using known means, such as on a sieve, or in a centrifuge, and are removed from the apparatus for ultimate use. At least part of the remaining solvent is fed back to the radial-symmetrical chmber, and can be partly re-used for the preparation of a polymer solution which recycle lowers the overall solvent requirements and hence the cost of the process. The portion recycled to the radial-symmetrical space is passed through a heat-exchanger, in which the temperature of the solvent is restored to the desired value by heating or cooling, as needed. Any polymeric powder formed in the fiber preparation stage and passing through the sieve, or the centrifuge or separation means employed, need not be removed from the circulating solvent, because the pulverulent particles serve as crystallization nuclei for the polymer precipitating in the rotary flow. Conveniently, then, the powder is left in the recirculating liquid.

Solvent adhering to the separated fibers also can be removed using conventional means such as by compression or evaporation. An alternative procedure is to wash the fibers with hot water, if necessary under reduced pressure, in which case the solvent evaporates. To this water additional materials, such as wetting agents and the like, may be included to achieve more thorough moistening of the fibers as well as deactivation of the catalyst residues.

If the fibers must contain certain materials or substances to render them particularly suited for some specific application, these substances can be conveniently added to the polymer solution; the fibers made from such a solution will consist of a homogeneous mixture of the added substances and the polymer. For example, addition of $TiO_2$ to the solution results in the formation of white fibers, and improves the printability of sheets made of these fibers. Further, mixtures of polymers can be dissolved in the solvent, or a mixture of polymer solutions can be employed for preparing fibers possessing specific desired properties. For example, the cohesion among the fibers in a sheet can be improved by adding an EPDM-rubber solution to the polymer solution rotating in the radial-symmetrical space.

It will be appreciated that the process of the present invention has several advantages over processing techniques previously used. In prior procedures for the preparation of polymer fibers, the polymer, after being thoroughly freed of solvent and catalyst components, is extruded and granulated, whereupon the granulate is spun to fibers by means of an extruder and a spinning machine, or processed to film, which is subsequently made into fibrils. The present invention, in which the fibers are recovered directly from the polymer solution, is of course much simpler than the known process and consequently faster and less costly to operate. Moreover, the complicated thorough removal of catalyst residues and solvent necessitated by the processing operation in a spinning machine, or film extruder, can now be dispensed with. At least a portion, preferably all, of the solvent remaining after removal of the polymer fibers can be directly recycled.

The process according to the present invention can be advantageously employed in a number of fiber-forming polymeric materials in the processing of homopolymers, copolymers or block copolymers of alpha-alkenes, preferably lower alpha-alkenes of 2 to 6 carbon atoms, such as ethylene, propylene, butylene-1, pentylene-1, 4-methylpentylene-1 and styrene. Other polymers such as polyethers, polycarbonates, polyesters, acrylopolymers and polyamides can also be processed to fibers by means of the process according to the present invention. It is preferred that the fiber-making process according to the present invention be conducted with polymers that are at least partly crystalline in the solid state, because the fibers obtained from them are very strong and branched, with the consequence that they will possess proper cohesion when used for the manufacture of polymeric articles.

A host of solvents customarily used in the processing of polymeric materials may be used. The following are merely illustrative: for use with a poly-alpha-olefin, such as polyethylene and polypropylene, one can choose for example from propane, isobutane, pentane, hexane, cyclohexane, heptane gasoline, pentamethylheptane, kerosene, halogenated hydrocarbons, benzene, toluene, xylene or mixtures of two or more of such solvents. Preferably a hydrocarbon is used having a boiling point below about 100° C.

The amount of polymer calculated on the total solvent supplied to the rotation chamber is selected such that the solution is not too viscous for proper rotary flow yet not too dilute for efficient precipitation of the polymer. Generally about 1 to 45 weight percent of polymer will be used and preferably 5 to 20 weight percent, calculated on the total weight of the solvent.

The invention will be further elucidated with reference to the embodiments of the present invention as illustrated in the drawings.

In the following descriptions of the drawings reference will be made to supplying specific reactants to and obtaining specific products from the various structures identified. It will be understood, however, that such identification is for the purpose of describing the invention in the fullest manner possible, that is, by referring to a specific operative embodiment. It will be understood that other reactants and products, as described above, may be used. By the use of specific reactants the description of the drawings will also serve as working examples of the invention.

Figure 1:
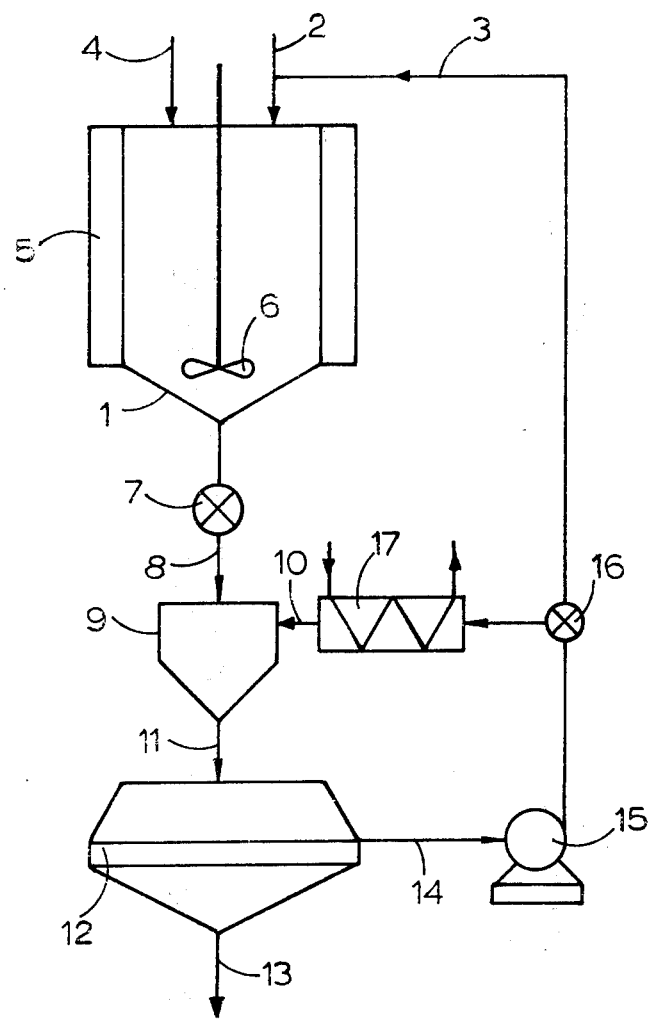
FIG. 1 shows a flowsheet for the preparation of polymer fibers commencing from a polymer solution.

Referring now to FIG. 1, vessel 1 is supplied with pentamethyl heptane via conduits 2 and 3 and high-density polyethylene via conduit 4. The vessel 1 is provided with a heating shell 5 through which steam is passed if additional heat energy input is needed for keeping the contents of the vessel at about 140° C. By means of a stirrer 6 the polyethylene is mixed and dissolved in the solution. The amounts of polyethylene and solvent, supplied as described above, are selected such that the polyethylene content of the solution is about 10 weight percent.

The solution of polyethylene and a solvent is fed into the center of a rotation chamber 9 via a control valve 7 and a discharge conduit 8. Pentamethylheptane is tangentially supplied to chamber 9 along a conduit 10, the feed pressure being such that a rotary flow is generated within the chamber. The temperature and the quantity of the solvent are so selected that, after the solvent has been mixed with the hot solution, the temperature is approximately 5° below the precipitation temperature of the polyethylene, which, under the conditions prevailing in the rotation chamber, is about 103°–107° C. In the rotary flow occurring in the rotation chamber strong shearing forces are generated which cause the polyethylene to precipitate in the form of fibers. The mixture of solvent and polyethylene fibers flows via a central aperture in the apex of the rotation chamber and further along conduit 11 into a centrifuge 12.

The fibrous polymer produced is discharged from the centrifuge at 13 and subjected to a further treatment (not shown in the drawing) for removal of the remaining solvent. Typical separation means include a sieve, pressing or the like, as described above.

The solvent separated off in the centrifuge flows along a conduit 14 to a pump 15, which feeds it back, via a distributing valve 16, one stream to vessel 1 along conduit 3 and another stream to rotation chamber 9 along conduit 10. The solvent pumped through conduit 10 first passes through a heat-exchanger 17, where it is reheated to the desired temperature; this temperature is, for example, 100° C. The heat-exchanger is operative to either add or remove heat. If, owing to exchange of heat with the surrounding atmosphere the solvent issuing from the rotation chamber has cooled down to below this temperature, it is reheated in the heat-exchanger. In the event the temperature of the solvent has not appreciably decreased and is above the desired temperature, the solvent is cooled in the heat-exchanger. The amount of solvent leaving the circuit at 13 together with issuing fibers is made up at 2.

Figure 2:
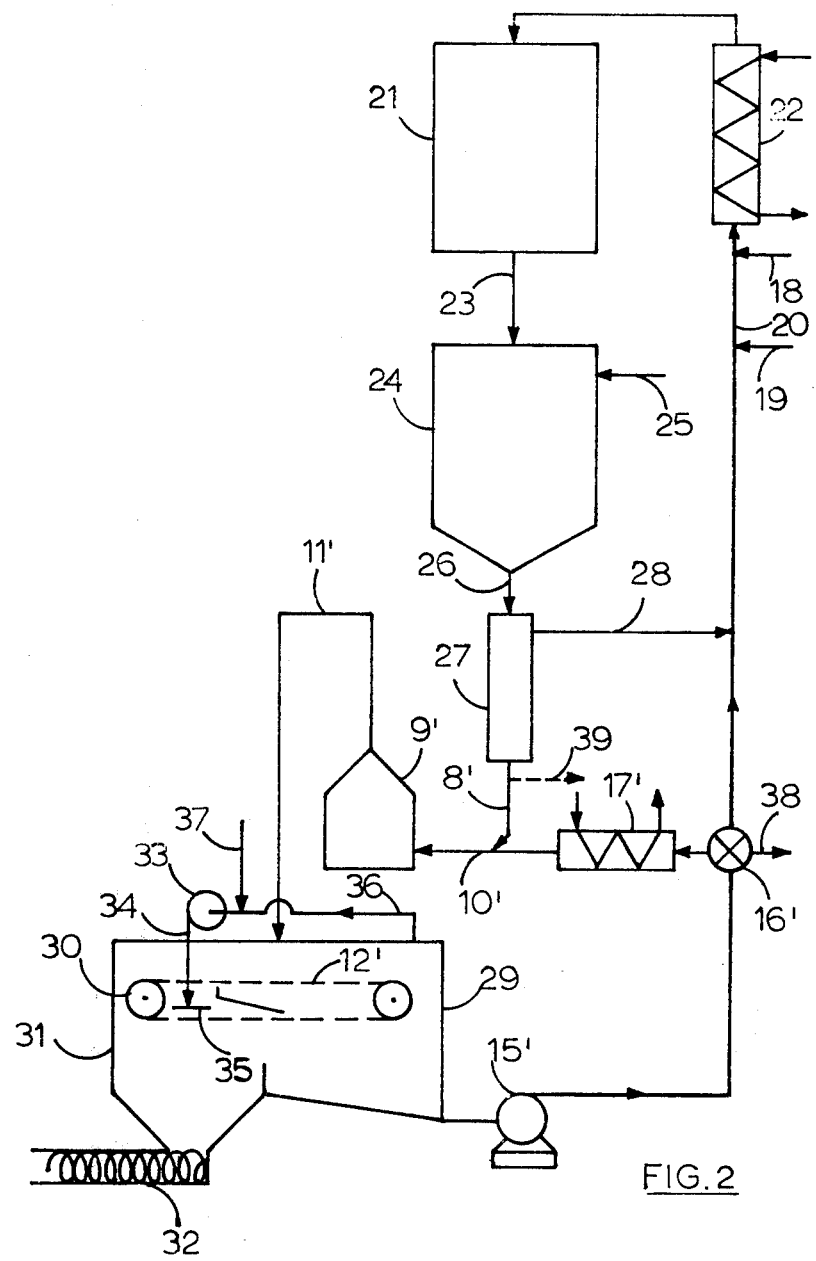
FIG. 2 shows a flowsheet for the preparation of polymer fibers combined with polymerization of a monomer.

Referring now to the flowsheet of FIG. 2, ethylene (4 kg/h) plus gasoline (21 kg/h) are fed to a dissolving vessel 21 along conduits 19 and 20, respectively. The temperature of the mixture supplied to the dissolving tank is adjusted at −20° C by means of a cooler 22. The solution leaves vessel 21 along a line 23 and flows to reactor 24, which has a capacity of 4.4 l. A suited catalyst, such as a mixture of ethyl-aluminum sesquichloride, dibutylmagnesium, titanium tetrachloride and VOCl$_3$ in gasoline prepared at −10° C, is supplied to the reactor along line 25, the amount supplied being such that the concentrations of the components in the reactor equal 0.8, 0.5, 0.003 and 0.002 L mmole/l, respectively. The pressure in the reactor i 34 atm. Under these reaction conditions the ethylene is converted to polyethylene, which remains dissolved in the gasoline. The temperature of the solution leaving the reactor along line 26 is approximately 140° C. The solution passes through a separator 27, in which unconverted monomer is separated off in a known manner, to be recycled, to the dissolving vessel along line 28, together with a small quantity of gasoline.

The polyethylene solution discharged from the separator along line 8' contains about 17% weight of polyethylene, and a temperature of 130° C. at a pressure of about 5 atm. Along line 10' gasoline (200 kg/h) at a temperature of 98° C is tangentially introduced into rotation chamber 9' so that a rotary flow is produced therein. The discharge line 8' of separator 27 empties into line 10', so that the polyethylene solution is injected into the rotation chamber 9' by the liquid flowing through line 10'. The temperature of the mixture in the rotation chamber is approximately 101° C. The polyethylene precipitates in the rotation chamber in the form of fibers. The mixture of polyethylene fibers and gasoline leaves the rotation chamber along line 11' which is connected to the top of the rotation chamber and empties into closed collecting tank 29, in which the issuing mixture passes through a sieve belt 12'. A closed collecting tank 29 is employed to prevent evaporation of the gasoline solvent. The fibers retained on the belt are deposited in a collecting hopper 31 placed near the reversing pulley 30 of the belt, from where they are carried off along a screw conveyor 32 for further processing. A fan 33, connecting to line 34, feeds nitrogen to the nozzles 35 in the collecting hopper, the nozzles being so disposed that fibers adhering to the lower face of the belt are blown off by the issuing nitrogen. The nitrogen is drawn off from the collecting hopper along line 36, losses of nitrogen being made up via line 37.

The gasoline recovered in the collecting hopper is discharged by pump 15'. A portion of this solvent is recycled to rotation chamber 9' along distributing valve 16' and heat exchanger 17' and another portion goes to dissolving vessel 21 along line 20. Further, part of the solvent can be discharged along line 38 to prevent accumulation of polymer powder formed in the solvent.

Figure 3:
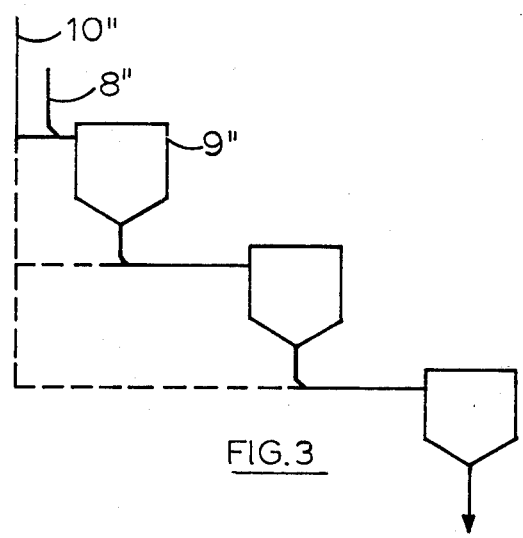
FIG. 3 shows the application of a number of series-fed rotation chambers.

The polymer-solvent mixture leaving the rotation chamber can also be tangentially introduced into a series of rotation chambers to be once more subjected to the action of a rotary flow before the fibers thus formed are separated from the mixture. In the flowsheet of FIG. 3, three rotation chambers 9" are arranged in series, the first of which is connected to a feed line 10" for the solvent and to a feed line 8" for the polymer solution. The rotation chambers can also be separately connected to feed line 10", as is illustrated by broken lines in FIG. 3. The use of series-connected rotation chambers has an increasing effect on the residence time of the polymer solution in the rotary flow and, hence, on the fiber output.

In yet another embodiment of the present invention it is also possible to subject only a portion of the polymer solution from the separator to a fiber-preparation treatment, and to process another portion in the customary manner. The latter portion is then carried off along conduit 39, indicated by a broken line.

Figure 4:
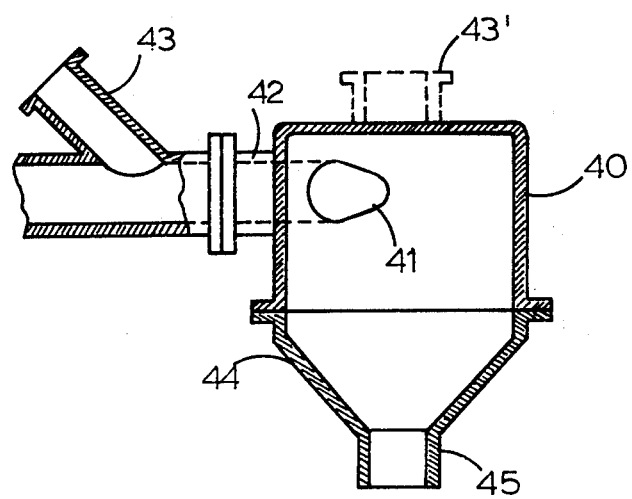
FIG. 4 is a longitudinal section through rotation chamber.

The rotation chamber 9 is shown in more detail in FIG. 4. The rotation chamber comprises a cylindrical housing 40 provided with a feed port 41 and a solvent feed tube 42 tangentially fitted to the housing 40. Via tube section 43, the feed conduit for the polymer solution is connected to tube section 42 so as to cause the polymer solution to be injected into the rotation chamber by the solvent. It is also possible, however, to feed the polymer solution direction into the rotation chamber along conduit 43', which in FIG. 4 is drawn in broken lines. The cylindrical housing 40 connects to a conical portion 44, which is provided with an axial tube section 45 for discharging the mixture of solvent and precipitated polymer fibers. In another embodiment (not illustrated) the mixture is discharged from the rotation chamber at two opposite points. Conduit 43' can then be used as a secondary discharge line. The fiber concentration of the fraction leaving the vortex chamber via the aperture in the conical part will, owing to the thickening effect, normally be higher than the concentration of the fraction issuing from the vortex chamber through line 43'. In the rotation chamber, in operation, as the polymer and solvent are mutually injected into the chamber a rotary flow occurs subjecting the polymer/solvent mixture to a rotary shearing force.

The diameter of the fibers obtained with the process according to the invention varies between a few microns and up to about 0.2 mm. The fibers may be fairly long, in which case they exhibit numerous branchings. Such fibers are eminently suited for production of paper-like products and if used for this purpose, they can be optionally mixed with normal-grade paper pulp, and be processed on the customary paper-making machines.

What is claimed:

1. A continuous process for preparing polymer fibers by concurrent precipitation and agitation of a fiber-forming polymer solution comprising the steps of:
   a. preparing a solution of a fiber forming polymer by dissolving the polymer in a solvent therefor;
   b. continuously supplying the thus-formed polymer solution to a radial symmetrical chamber;
   c. continuously supplying a precipitant for said polymer to said radial-symmetrical chamber in an amount and at a temperature such that the temperature of the polymer solution-precipitant mixture is below the precipitation temperature of said polymer;
   d. subjecting the introduced polymer solution to shearing forces by creating within said radial symmetrical chamber a rotary flow causing said polymer in the polymer solution to precipitate in a fibrous structure and form fibers under said shearing forces;
   e. continuously removing the fibers and solvent as a mixture from the chamber;
   f. separating and collecting the fibers from the solvent; and
   g. recycling at least a portion of the fiber free solvent to the rotation chamber after conforming the recycle temperature to the temperature of the flow in the rotation chamber.

2. The process according to claim 1 wherein said fiber-forming polymer is an alpha-alkene having 2–6 carbon atoms.

3. The process according to claim 1 wherein the temperature of the solvent in said chamber is about 5° to about 15° C below the precipitation temperature of said polymer in said solvent.

4. The process according to claim 1 wherein the fiber-forming polymer solution is mixed with the precipitant prior to step (b).

5. The process according to claim 1 wherein the fiber-forming polymer solution is mixed with the precipitant during step (b) by continuously supplying the precipitant to the rotation chamber in a tangential direction with respect to the rotary flow in the chamber.

6. The process of claim 1 wherein the fiber-forming polymer solvent and the precipitant are the same.

7. A process for preparing polymer fibers by the concurrent pecipitation and agitation of a fiber-forming polymer in solution comprising the steps of:
   a. continuously supplying a solution of a fiber-forming polymer in a solvent therefor at a temperature of about 5 to about 15 centigrade degrees below the precipitation temperature of said polymer in said solvent to a rotary flow of solvent and polymer contained and rotating within and about the axis of a radial-symmetrical rotation chamber, said solution being supplied to said chamber in direction tangential to said rotary flow and under pressure such that it passes through said chamber in a rotary flow, thereby causing said polymer to precipitate in a fibrous structure and form fibers while under the influence of shearing forces in said rotary flow;
   b. continuously removing said fibers and said solvent as a mixture from said chamber along the axis thereof;
   c. separating said fibers from said mixture of step (b);
   d. recycling at least a portion of said solvent to said chamber and adjusting the temperature of said recycled solvent, prior to introduction into said chamber, to the temperature of the solution of step (a).

8. In a process for preparing polymer fibers by concurrent precipitation and agitation of a fiber-forming polymer in a solvent therefor including the steps of mixing said polymer solution with a precipitant therefor in an amount and at a temperature such that the temperature of the resulting mixture is below the precipitation temperature of the polymer, the improvement comprising introducing the polymer-solution-precipitant into a radial-symmetrical chamber in a tangential direction with respect to the rotary flow in the chamber and subjecting the thus introduced solution to shearing forces within the chamber while concurrently precipitating the polymer from the solution, thereafter removing the thus precipitated polymer in the form of fibers together with solvent, separating the fibers from the solvent and recycling at least a portion of the recovered solvent to the radial-symmetrical chamber.

* * * * *